(12) United States Patent
Liu et al.

(10) Patent No.: US 8,711,471 B2
(45) Date of Patent: Apr. 29, 2014

(54) HIGH POWER FIBER AMPLIFIER WITH STABLE OUTPUT

(75) Inventors: Chang Liu, Shanghai (CN); Jason N. Farmer, Vancouver, WA (US); Anmol Nijjar, Fremont, CA (US); Xiaojun Li, Shanghai (CN)

(73) Assignee: nLight Photonics Corporation, Vancouver, WA (US)

( * ) Notice: Subject to any disclaimer, the term of this patent is extended or adjusted under 35 U.S.C. 154(b) by 880 days.

(21) Appl. No.: 12/757,737

(22) Filed: Apr. 9, 2010

(65) Prior Publication Data

US 2011/0058250 A1    Mar. 10, 2011

Related U.S. Application Data

(63) Continuation of application No. 12/545,791, filed on Aug. 21, 2009, now abandoned.

(60) Provisional application No. 61/090,854, filed on Aug. 21, 2008.

(51) Int. Cl.
*H01S 3/098* (2006.01)

(52) U.S. Cl.
USPC ............................. 359/337; 359/340

(58) Field of Classification Search
USPC ................... 359/337, 340; 372/19
See application file for complete search history.

(56) References Cited

U.S. PATENT DOCUMENTS

| | | | |
|---|---|---|---|
| 5,745,284 A | 4/1998 | Goldberg et al. | |
| 5,818,630 A | 10/1998 | Fermann et al. | |
| 6,278,816 B1 * | 8/2001 | Keur et al. | 385/29 |
| 6,496,301 B1 * | 12/2002 | Koplow et al. | 359/337 |
| 7,637,126 B2 | 12/2009 | Koeppler et al. | |
| 8,068,705 B2 | 11/2011 | Gapontsev et al. | |
| 2005/0008044 A1 * | 1/2005 | Fermann et al. | 372/19 |
| 2009/0136176 A1 * | 5/2009 | Kopp et al. | 385/29 |
| 2010/0247047 A1 | 9/2010 | Filippov et al. | |
| 2011/0058250 A1 | 3/2011 | Liu et al. | |
| 2011/0069723 A1 | 3/2011 | Dong et al. | |
| 2011/0157671 A1 | 6/2011 | Koplow | |
| 2012/0127563 A1 | 5/2012 | Farmer et al. | |

FOREIGN PATENT DOCUMENTS

| | | |
|---|---|---|
| WO | WO 92/10014 | 6/1992 |
| WO | WO 2005/022705 | 3/2005 |
| WO | WO 2009/043968 | 4/2009 |
| WO | WO 2011/066440 | 6/2011 |
| WO | WO 2013/102033 | 7/2013 |

OTHER PUBLICATIONS

Eidam et al., "Femtosecond fiber CPA system emitting 830 W average output power," Opt. Lett. 35, 94-96 (2010).

(Continued)

*Primary Examiner* — Mark Hellner
(74) *Attorney, Agent, or Firm* — Klarquist Sparkman, LLP

(57) ABSTRACT

A stable, single mode fiber amplifier is described. The amplifier consists of a seed source, a passive single clad multimode fiber, an active double clad multimode fiber or a multimode fiber horn and a semiconductor laser pump source. The passive fiber is packaged on a mandrel with a compound radius of curvature such that high order modes in the fiber are stripped from the core leaving only the fundamental mode. This fiber is then spliced to a multimode active fiber of similar core diameter. By exciting only the fundamental mode of this active fiber, stable single mode amplification is achieved.

34 Claims, 15 Drawing Sheets

(56) References Cited

OTHER PUBLICATIONS

Russbueldt et al., "400 W Yb:YAG Innoslab fs-amplifier," Opt. Express 17, 12230-12245 (2009).

Stolzenburg et al., "Picosecond Regenerative Yb:YAG Thin Disk Amplifier at 200 kHz Repetition Rate and 62 W Output Power," in *Advanced Solid-State Photonics*, OSA Technical Digest Series (CD) (Optical Society of America, 2007), paper MA6 (3 pgs.).

International Search Report from International Application No. PCT/US2013/030569, dated Jul. 4, 2013, 3 pp.

Written Opinion from International Application No. PCT/US2013/030569, dated Jul. 4, 2013, 5 pp.

International Search Report from International Application No. PCT/US2012/072003, dated Apr. 4, 2013, 2 pp.

Written opinion from International Application No. PCT/US2012/072003, dated Apr. 4, 2013, 3 pp.

* cited by examiner

HIGH POWER FIBER AMPLIFIER WITH STABLE OUTPUT

CROSS REFERENCE TO RELATED APPLICATION

This application claims the benefit of U.S. Provisional Patent Application No. 61/090,854, filed Aug. 21, 2008, and is a continuation of U.S. patent application Ser. No. 12/545,791, filed Aug. 21, 2009, both of which are incorporated herein by reference.

FIELD

This invention relates to fiber amplifiers and more specifically to a method of exciting only the fundamental mode of a multimode fiber within an amplifier or other waveguide-based device such that stable and high efficiency amplification of the fundamental mode is possible.

BACKGROUND

Over the past twenty years, rare earth doped optical fibers have had a tremendous impact on the laser industry. The first application that deployed a significant volume of rare earth doped optical fiber based devices was optical amplification in the telecommunications industry. In this application, optical signals carrying data are sent through single mode fiber typically at a wavelength near 1.5 microns. As these signals propagate over long distances, they are attenuated due to scattering and absorption losses in the transmission fiber. By coupling these transmission fibers to a section of Erbium doped fiber that is pumped with a wavelength near 980 nm or 1480 nm, these signals can be amplified back to their original intensity level. These devices are commonly known as erbium doped fiber amplifiers or EDFAs.

When compared with other lasers and optical amplifiers, fiber based devices typically offer higher gain and higher overall efficiency. As the average power levels, pulse energies and peak powers of fiber lasers and fiber amplifiers continue to increase, rare earth doped optical fibers have begun to be used in a far broader range of applications. These applications are found in the medical, industrial, defense, and semiconductor processing industries.

Continued expansion of fiber laser applications requires further increases in average power, pulse energy and peak power. Increasing the average power of fiber lasers is largely driven by the brightness of laser diode pumps and the ability to couple power into fiber. Pulse energy and peak power on the other hand are respectively driven by the ability to store and extract energy in the fiber while mitigating the nonlinear processes than can have adverse impacts on the temporal and spectral content of the output pulse. Both of these issues can be effectively addressed by using fibers with large core sizes.

The fundamental transverse mode of an optical fiber has very desirable characteristics in terms of beam shape, minimum beam expansion during propagation through free space (often referred to as "diffraction limited") and optimum focus-ability. However, as a result, most applications benefit greatly from single mode or fundamental mode operation of fiber lasers and amplifiers. As the core size of an optical fiber is increased, the fiber begins to support the propagation of more than one transverse optical mode. The number of modes supported by an optical fiber can be roughly calculated by using the fiber's so-called V-number. The V-number of a fiber is defined as $$V = 2\pi a/\lambda NA$$

wherein a is the diameter of the fiber core and NA is the numerical aperture of the core. The number of modes supported by the fiber is given by roughly one half the square of the V-number. It can be shown that a fiber with a V-number less than about 2.4 supports the propagation of only the fundamental mode.

In a typical high peak power, high pulse energy fiber amplifier today, the core might have an aperture of 25 microns and an NA of 0.07 giving a V-number of over 10. Such a fiber supports the propagation of several higher order modes. Achieving fundamental mode output from an amplifier using such a multimode fiber therefore requires either a method to prevent the excitation of higher order modes or to remove the higher order modes from the light propagating in the fiber.

In U.S. Pat. No. 5,818,630, an approach is disclosed wherein a near diffraction limited seed source is optically coupled to a multi-mode fiber amplifier. Through the use of a mode-converter, defined as either a set of bulk lenses or a tapered section of fiber, the beam size is changed to match as nearly as possible that of the fundamental mode of the multimode amplifier fiber.

It is generally difficult to excite only the fundamental mode of the amplifier fiber even if a mode convertor is used. The fundamental mode of most seed lasers is not the same as the fundamental mode of an optical fiber. For this reason, even with a mode-converter described in U.S. Pat. No. 5,818,630, higher order modes of the multimode optical fiber will typically be excited to some extent.

Further, any changes in launch conditions that result, for example, through optic movements that can be induced by the operating environmental conditions such as, for example, vibration or changes in temperature, can alter the amount of seed power coupled into each of the numerous optical modes of the fiber. This causes the corresponding changes in output beam shape and mode quality.

The inventors have also observed that when higher order modes are excited in multimode fiber the output beam shape and mode quality is highly sensitive to both micro and macro bends in the fiber. Even with a stable package that prevents changes in micro and macro bending of the fiber during operation, this sensitivity makes manufacturing of the device challenging as the output is not stable.

These issues limit the utility of this amplifier configuration for many applications.

In U.S. Pat. No. 6,496,301, which is incorporated herein by reference, discloses an optical amplifier that enables embodiments where the coupling of seed light into a multimode amplifier results in the excitation of higher order modes. To prevent these higher order modes from impacting the output beam, this invention tightly coils the amplifier fiber. This approach results in a distributed bend induced loss that strips the power from the higher order modes in the amplifier fiber.

The bend induced loss is a relatively strong function of the spatial order of the fiber mode. For modes that are radially symmetric, the loss is independent of the axis of the coil with higher order modes experiencing higher loss. For modes that are radially asymmetric, the loss is dependent on the axis of the coil. To ensure sufficient loss for all modes, it is therefore sometimes required to coil the fiber about one axis followed by a coil on an axis oriented at 90 degrees with respect to the first one. Amplifiers made in this way can be designed to operate stably on only the fundamental mode.

Unfortunately, there are also other practical limitations associated with this design. One limitation is that to strip the higher order modes effectively, some loss is also created for the fundamental mode. This distributed loss for the fundamental mode limits the overall efficiency of the fiber amplifier. Another limitation is that light lost from the core to bend losses is captured by the pump cladding. This light then exits the output end of the fiber and results in a halo of light surrounding the main output beam. Yet a third limitation associated with this design is that as the fiber is bent, the effective mode area of the fundamental beam is reduced. This increases the irradiance of the signal within the fiber and, as described earlier, leads to increased amounts of nonlinear effects. These nonlinear effects can limit the peak power capability of the fiber amplifier.

It is clear that further improvements in peak power require an improved fiber amplifier.

SUMMARY

An object of the present invention is to provide a stable optical fiber amplifier with high overall efficiency that has a fundamental mode or near fundamental mode output.

Another object of the present invention is to provide a method and apparatus that enables almost any seed laser to excite only the fundamental mode of an optical fiber.

A further object of the present invention is to provide a method and apparatus that enables stable single mode operation of a multimode amplifier fiber without the need to limit its efficiency through the provision of a distributed loss in the amplifier fiber.

Yet another object of the present invention is to provide a method and apparatus for stripping higher order modes from a fiber while leaving the fundamental mode.

To achieve the above objects, the present invention employs a mode filter based on a passive multimode mode fiber between the seed laser and the multimode fiber amplifier. The seed laser is optically coupled to the mode filter. The mode filter operates to strip the higher order modes before the seed light is coupled into the multimode amplifier fiber. The seed light then excites substantially only the fundamental mode of the multimode amplifier fiber. Quite unexpectedly, the inventors found that if substantially only the fundamental mode of the multimode amplifier fiber is excited the amplifier will operate stably on the fundamental mode without need for further mode filtering.

In one embodiment of the mode filter, the passive multimode fiber that comprises the mode filter prior to the multimode amplifier fiber is coiled thereby stripping any higher order modes that are excited during the coupling through bend losses. After stripping the higher order modes, the only light left propagating in the fiber is in the fundamental mode. Further, by using a single clad multimode fiber, the light stripped from the higher order modes is absorbed along the jacketing of the fiber. Using a single clad fiber and not a double clad fiber prevents the stripped light from being trapped in the cladding and creating a halo like output. Further, the use of a single clad fiber can also offer protection to the seed laser in that any backward propagating light, for example pump light in an amplifier geometry where the pump light is counter propagating with the signal light, is absorbed by the fiber coating. In yet another geometry, the single clad fiber can be fused to a double clad rare-earth doped amplifier fiber and can be spliced to the single clad fiber in a counter-propagating geometry with a high index recoating material around the splice. This high index material can strip any counter propagating light and direct it to a heatsink.

It was further observed by the inventors that while bending the fiber does strip light from higher order modes, it also promotes mode coupling. For example, by bending the fiber, some of the light in the fundamental mode can be coupled, or scattered, into a higher order mode. To address this issue, this invention further makes use of a novel mode stripper that is coiled along a path that has what we refer to as a compound radius of curvature. This novel coiling geometry creates losses for all modes eliminating the buildup of power in some modes when a simple helical coil is used. In representative examples, this coiling geometry provides losses of at least 3 dB, 5 dB, 10 dB, 20 dB, or greater for propagation in an LP11 mode in any orientation.

This passive multimode fiber is then coupled or spliced to the multimode fiber amplifier. If the passive multimode fiber and the active multimode fiber have similar mode field diameters for the fundamental mode (i.e., have similar numerical apertures and core diameters), only the fundamental mode of the multimode amplifier fiber will be excited. This enables the amplifier to operate as a fundamental mode amplifier. The inventors have found that using a fiber with a uniform index core with a 25 micron diameter and an NA of 0.07, results in very stable fundamental mode output from the fiber without the need for introducing bend induced losses.

In another embodiment of the present invention the mode filter comprises a single clad, passive optical fiber with a taper. Both the input side and the output side of the fiber are multimode. The central portion of the fiber is tapered down to reduce the diameter of the core. The core diameter is tapered down to the point that it only supports the propagation of a single mode. The fiber is subsequently tapered back up to a core size that is again multimode and matches the diameter of the multimode amplifier fiber. In this embodiment, the length of the single mode section of the fiber is sufficient to strip higher order modes. The up taper is done at a rate that higher order modes are not excited.

Optical amplifier systems based on large mode area fibers and the disclosed mode filters comprise a light source for producing a seed light beam and a mode filter operable to receive the seed light source. A mode filter is operable to receive the seed light beam and comprises a multimode optical fiber that includes a fiber portion configured to substantially attenuate at least one higher order mode with respect to a fundamental mode. A multimode fiber amplifier comprises a rare earth doped multimode amplifier optical fiber configured to receive the mode filtered seed light beam, and a pump light source configured to direct pump light into the rare earth doped multimode amplifier optical fiber and produce optical gain, and wherein core diameters and numerical apertures of the mode filter multimode optical fiber and the multimode amplifier optical fiber are matched. In some examples, mode filter multimode fiber has more than one optical cladding disposed around its core. In other examples, pump light from the optical pump source is counter-propagating or co-propagating with light from the seed light source. In some examples, the pump source includes two optical radiation sources that are coupled to the multimode optical amplifier fiber in both co- and counter-propagating geometries. In some examples, the core of the multimode amplifier optical fiber and the core of the multimode mode filter fiber are polarization-maintaining using any one of an elliptical core, an elliptical optical cladding, a panda or bow-tie configuration, and a D-shaped section. In some examples, the seed light source is a diode pumped solid state laser, a micro-chip laser, a passively q-switched laser, a diode laser, a mode-locked laser, a fiber laser, or a combination of one or more thereof. In some examples the light source is operated with a continuous wave output or with a pulsed output or a wavelength chirped pulse output. In some examples, the light source has a polarized output. In other examples, output from the amplifier is frequency converted using a nonlinear optical stage. In some examples, the seed laser is coupled into the amplifier fiber, the seed laser producing pulses having durations in a range of 0.1 to 20 nanoseconds, 10 to 500 nanoseconds, 1 to 500 picoseconds, 0.2 to 50 microseconds, 20 to 500 microseconds, or 0.2 to 5 milliseconds. In other examples, the amplifier output is time-compressed with a pulse compressor so as to provide pulses having durations between 0.01 and 10 picoseconds.

This amplifier has numerous advantages. First, as there are no, or minimal, bend induced losses, the amplifier operates with high overall efficiency. Second, as the fiber is not tightly coiled, there is no bend induced reduction in mode area. This maximal mode area enables higher peak powers and pulse energies to be extracted from the amplifier without being negatively impacted by nonlinear effects. Yet another benefit is that, as only the fundamental mode is excited, the output beam from the amplifier is stable and insensitive to perturbations to the fiber.

These and further objects, features and advantages of the present invention will be apparent from the following detailed description of preferred embodiments and the accompanying drawings.

DETAILED DESCRIPTION

Figure 1:
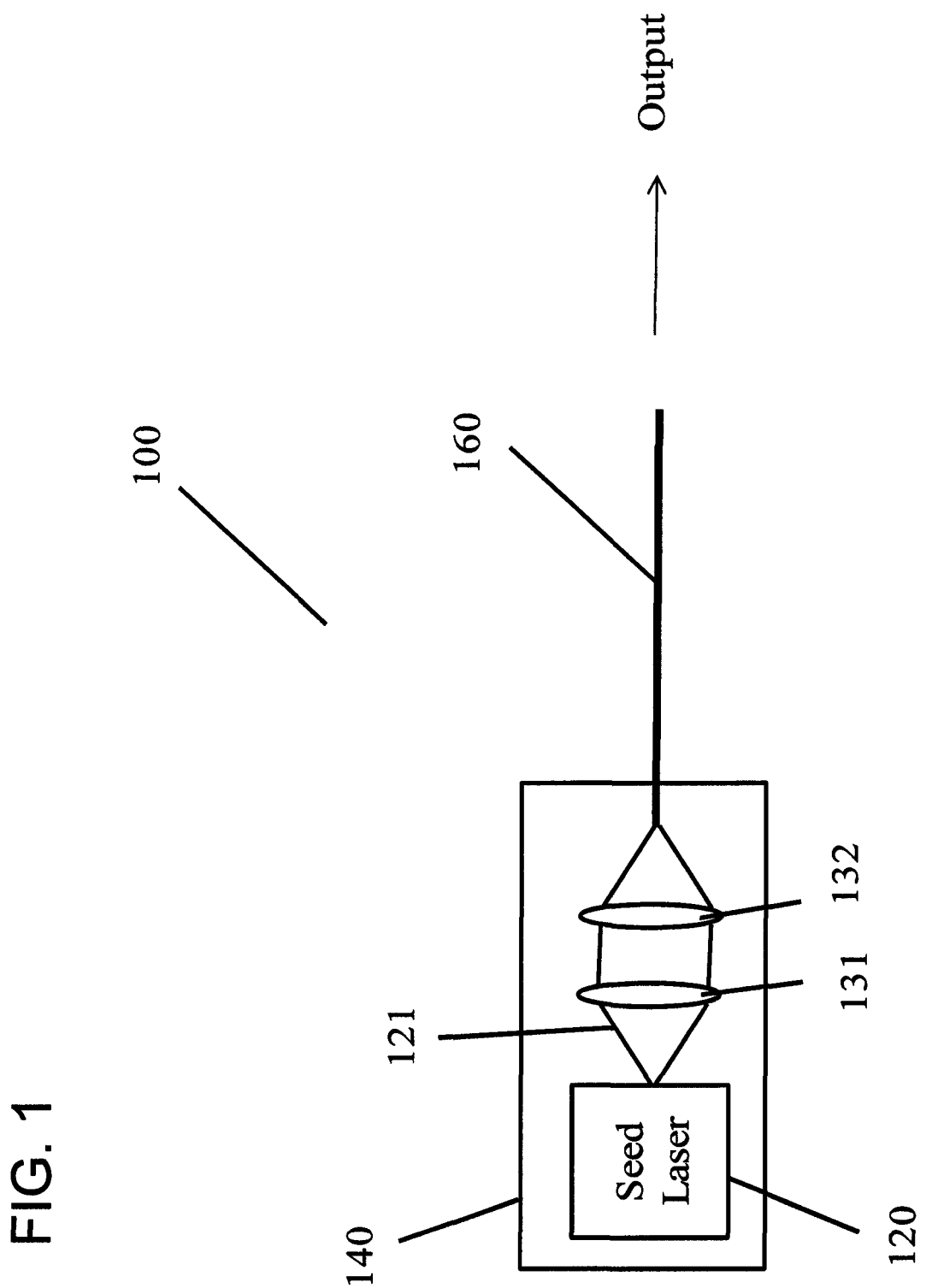
FIG. 1 is a schematic of a seed laser according to a particular embodiment of the present invention.

In the following description of the embodiments, reference to the accompanying drawings is by way of illustration of an example by which the invention may be practiced. It will be understood that other embodiments may be made without departing from the scope of the invention disclosed.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

While single mode fibers are convenient in some examples, in other examples fibers that support a few modes can be used and are referred to herein as "few mode" fibers. Such fibers have a normalized frequency parameter (V-number) defined as $V=(2\pi a/\lambda)(n_{core}^2-n_{clad}^2)^{1/2}$, wherein $\lambda$ is vacuum wavelength, a is a fiber core radius, and $n_{core}$, $n_{clad}$ are fiber core and fiber cladding refractive indices, respectively. For large V-number, t total number M of modes supported by a fiber is approximately $M=4V^2/\pi^2+2$. For single mode fibers, V is less than about 2.405. As used herein, a few mode fiber is defined as a fiber for which a V-number is less than about 5, 10 or 20.

In some examples, so-called double clad or double core fibers are used. A double clad fiber typically includes a core, an inner cladding, and an outer cladding. The core is typically selected to define a single mode (or few mode) waveguide, while the inner cladding defines a multimode waveguide. Generally, a refractive index difference between the inner cladding and the outer cladding is relatively large so that a numerical aperture of the multimode waveguide defined by the inner and outer claddings can be large. A double core fiber typically includes a first (inner) core, a second (outer) core, and an outer cladding. The first core is selected to define a single mode (or few mode) waveguide prior to any tapering. The second core is selected to define a single mode (or few mode) waveguide after tapering. Generally, refractive index differences between first core, second core, and outer cladding are relatively small.

While the examples are described with reference to optical fibers, other waveguides such as planar waveguides can be similarly arranged. Because optical fiber technology is well known, examples based on optical fibers are convenient. Reference is also made to waveguide or fiber-based optical amplifiers. As will be appreciated, a laser includes an optical amplifier and a feedback device such as a fiber Bragg grating.

The description above is for convenient explanation only, and the disclosed methods and apparatus are not limited to this explanation. In addition, while bends are typically circular they can also be elliptical, parabolic, hyperbolic, ovoid, or other shapes. Bends can be continuous, or be based on a series of stepwise bends, or combinations of steps and curves. Further the radii or axes of curvature can vary along a fiber length, and can be a continuous or discontinuous function of fiber axial coordinate (z). While the term "bend radius" is used herein, such a bend radius need not refer to a circular radius but generally refers to a local curvature or an approximation to a local curvature. As used herein, a compound fiber curvature refers to a fiber curvature about continuously or step-wise varying axes of curvature, wherein the axes of curvature are not collinear. The variations in the axes of curvature are such that a fiber does not form a complete loop about a fixed axis before a direction of the axis is changed. Curvature magnitudes can be constant or varying.

In some examples, this invention makes use of doped multimode optical fiber to amplify light. A first embodiment of the present invention amplifies light from a fiber coupled seed laser 100. More particularly, this fiber coupled seed laser 100 comprises a seed laser 120 that has an output beam 121 that is optically coupled to an output fiber 160. This optical coupling can be done with any number of known optical systems, for example a first collimating lens 131 and a second fiber coupling lens 132. All of these components can then advantageously be affixed within a common package 140.

Figure 2:
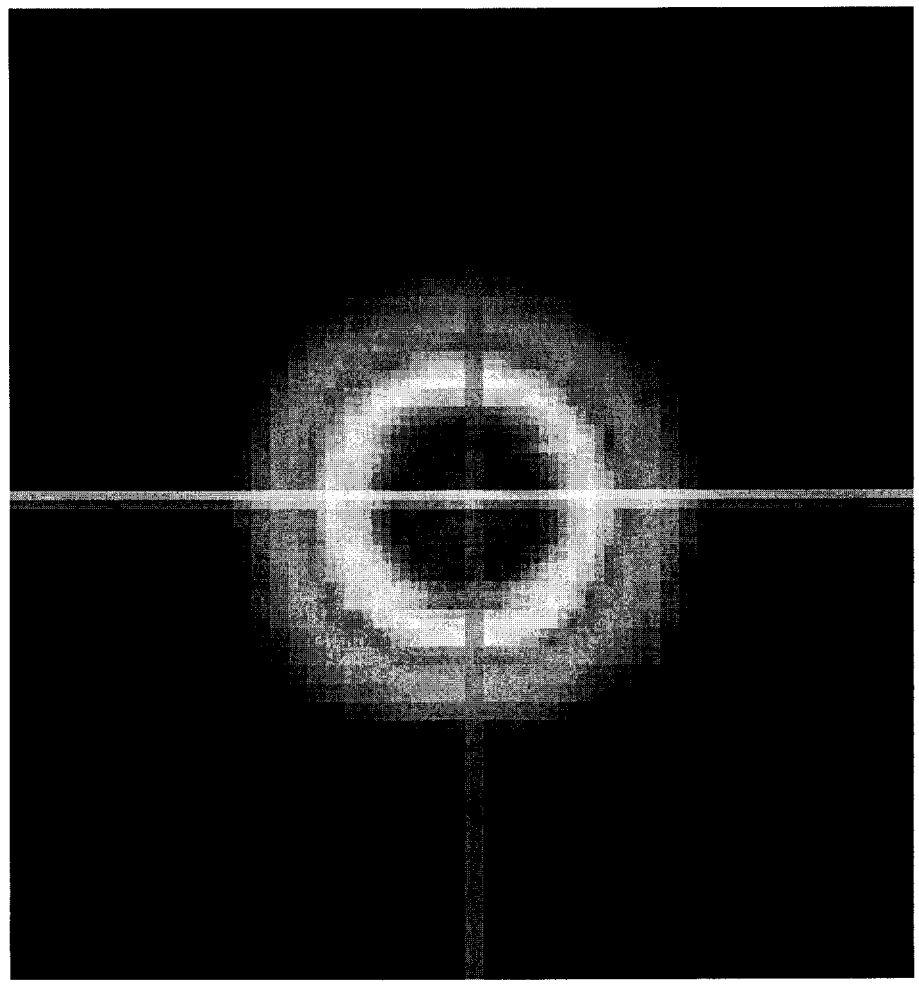
FIG. 2 shows the direct output spatial profile of the seed laser used to demonstrate a particular embodiment of the present invention.
Figure 3:
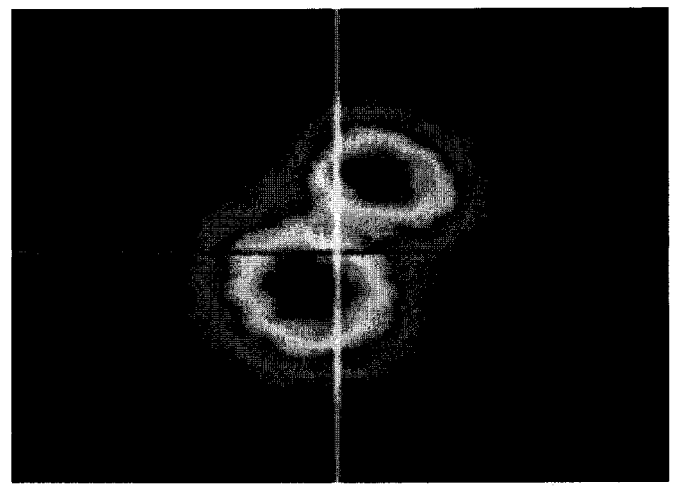
FIG. 3 shows the instability of the spatial profile of the output mode of a seed laser coupled directly into a multimode optical fiber.
Figure 3:
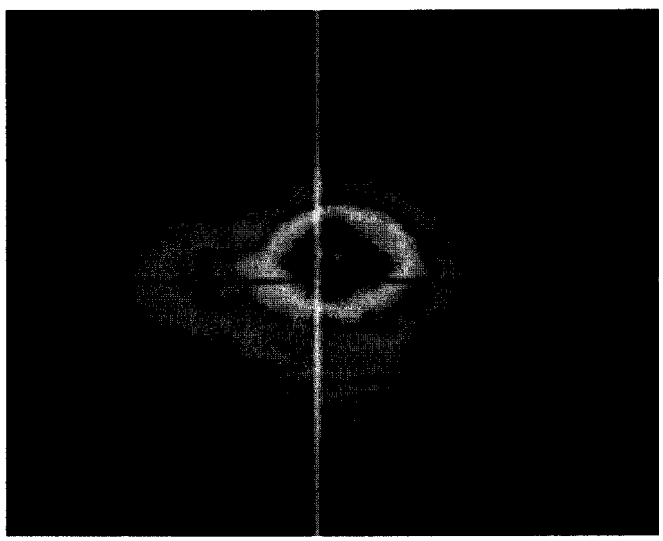
Figure 3:
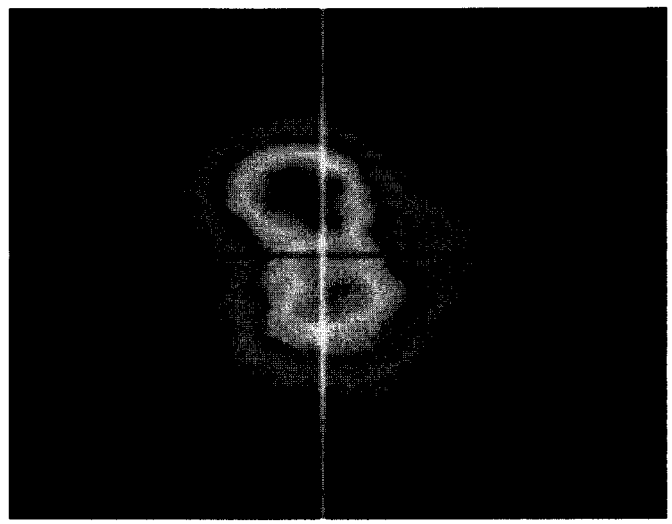

To reduce a particular embodiment of this invention to practice, the inventors made use of a diode pumped solid state laser as a seed laser 120. An image of the output beam is shown in FIG. 2. As can be seen, the beam has a very nearly Gaussian shape. Measurements of the beam quality showed the output to be less than 1.1 times diffraction limited. This diode pumped laser was used to assemble a particular embodiment of the fiber coupled seed laser 100. In this case, the laser was coupled to an output fiber 160 with a core diameter of 25 microns and a numerical aperture of 0.07. While it was found that a majority of the output power from the seed laser 120 could be coupled into the fundamental mode of the output fiber 160, some power was always coupled into higher order modes as well. Further the inventors found that the distribution of power in the various fiber modes was not stable. For example, simply touching the fiber resulted in radical changes in the amount of power in each mode. To show this effect, the output fiber 160 was cleaved and the beam transmitted through output fiber 160 was imaged with a camera. FIG. 3 shows some of the variations that occur when the output fiber experiences slight mechanical disturbances. When this fiber is connected directly to a multimode amplifier fiber, the same variations are seen at the output of the amplifier limiting the utility of the system.

Figure 4:
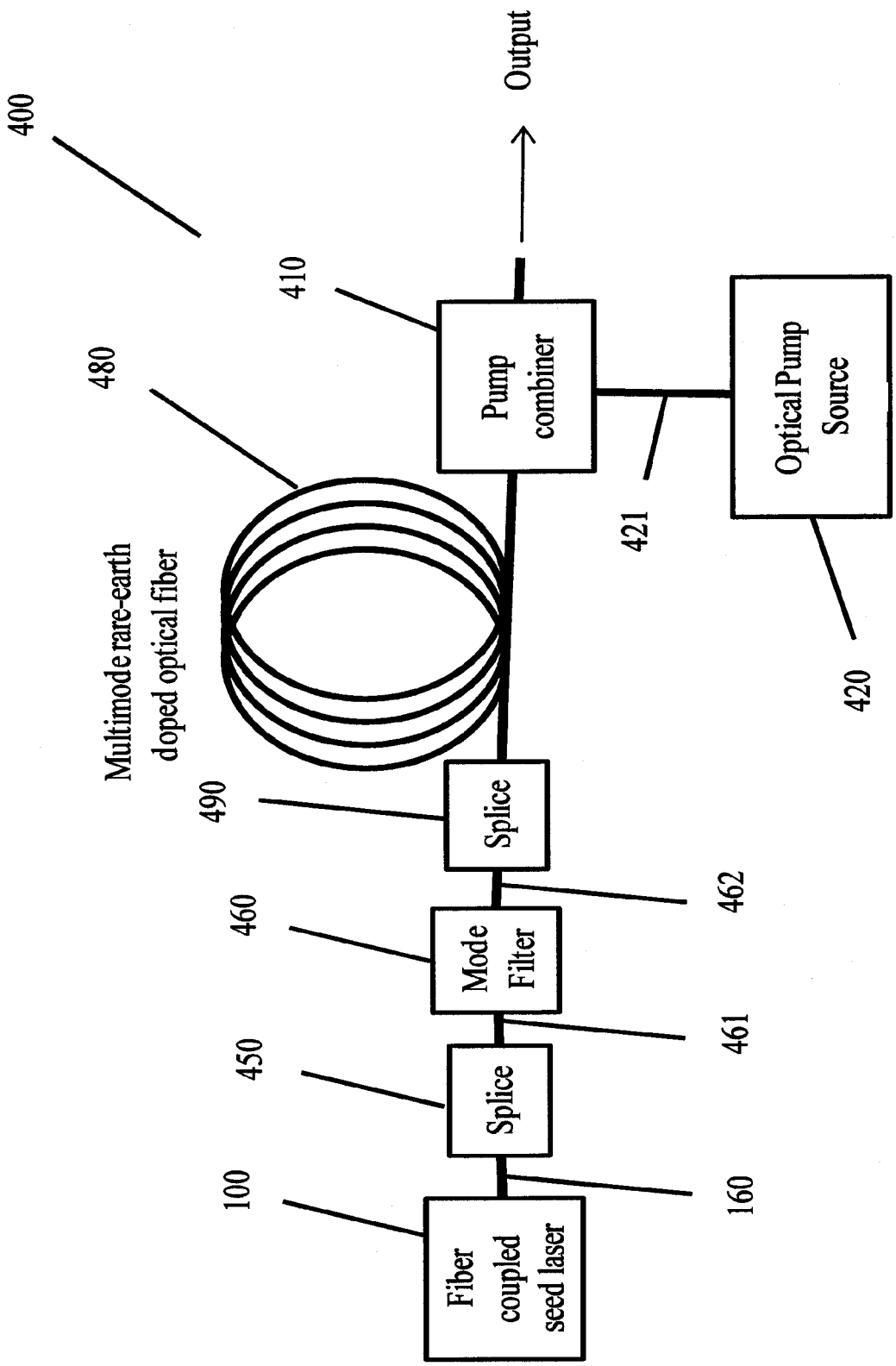
FIG. 4 shows a schematic of a multimode fiber amplifier according to a preferred embodiment of the present invention.

To overcome this limitation, the inventors have inventively developed a mode filter 460. The mode filter 460 operates to strip optical power from higher order modes of the multimode fiber 461. Representative mode filters are illustrated in FIGS. 5A-7 and are described below. In operation, the mode filter has multimode input fiber 461 and multimode output fiber 462. Multimode input fiber 461 and multimode output fiber 462 can be the same length of optical fiber, but could also consist of more than one fiber that are spliced or otherwise optically coupled to one another. FIG. 4 shows these two fibers are advantageously spliced to one another with splice 450 although other optical coupling arrangements could also be used. Mode filter 460 removes substantially all the higher order mode content from input fiber 461 such that substantially all of the power in multimode output fiber 462 is contained in the fundamental mode.

Output fiber 462 is optically coupled to multimode rare-earth doped amplifier fiber 480 with splice 490. Output fiber 462 and rare-earth doped amplifier fiber 480 are chosen such that the mode field diameters of their respective fundamental modes are closely matched. In this way, only the fundamental mode of multimode rare-earth doped fiber amplifier 480 is excited. The rare-earth dopant in multimode rare-earth doped fiber amplifier 480 is chosen such that its optical gain spectrum overlaps at least to some extent with the spectral content of fiber coupled seed laser 100. For example, ytterbium could be used as a rare-earth dopant if the seed laser contains wavelengths between 1030 nm and 1090 nm such as, for example, the output from a Nd:YAG laser. In other embodiments other rare-earth dopants can be used.

The multimode rare-earth doped amplifier fiber 480 could be fabricated using one of many known designs. For example it could be a double clad fiber where the seed light is amplified in a core and the pump light is contained in a cladding surrounding the core or both signal and pump light could be contained within the core. If fiber coupled seed laser 100 is polarized, multimode rare-earth doped fiber amplifier 480 could also employ one of numerous known designs to make it polarization maintaining, for example with an elliptical core, or panda or bow tie type fiber geometries.

The multimode rare-earth doped amplifier fiber 480 is pumped with optical pump source 420 whose output spectrum is chosen to overlap with the absorption spectrum of rare-earth doped amplifier fiber 480. If, for example, ytterbium is chosen as the rare-earth dopant, a suitable choice for optical pump source 420 would be a fiber coupled laser diode that operates with an output wavelength near 976 nanometers. The optical pump source is advantageously coupled to an output fiber 421 that is chosen to have a beam parameter product that is less than or equal to the beam parameter product of the pump confining waveguide of multimode rare-earth doped fiber amplifier 480. The output from optical pump source 420 is then optically coupled to the pump confining waveguide of multimode rare-earth doped fiber amplifier 480 with a pump combiner 410. There are numerous known pump plus signal combiner technologies that can be used for the pump combiner 410 that employ either all fiber based optical paths or free space optical paths. Further, while the pump is shown in as counter-propagating with the signal light, the pump could alternatively be introduced before multimode rare-earth doped amplifier fiber 480 such that light from output from fiber coupled seed laser and the pump light are co-propagating in the multimode rare-earth doped amplifier fiber 480. In yet another embodiment, pump light could be introduced from both sides of multimode rare-earth doped amplifier fiber 480.

Figure 5A:
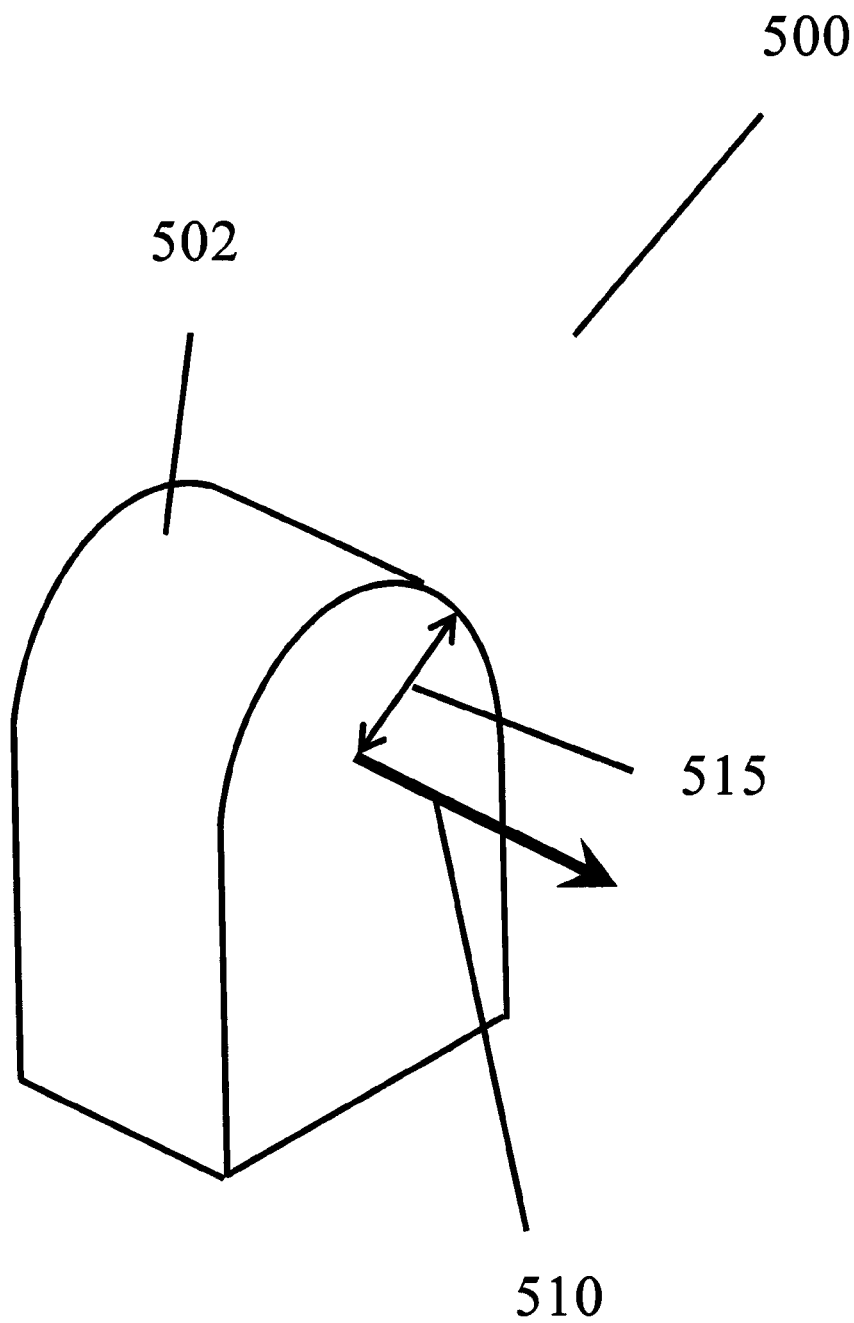
FIG. 5A shows a support member in accordance with a particular embodiment of the present invention.
Figure 5B:
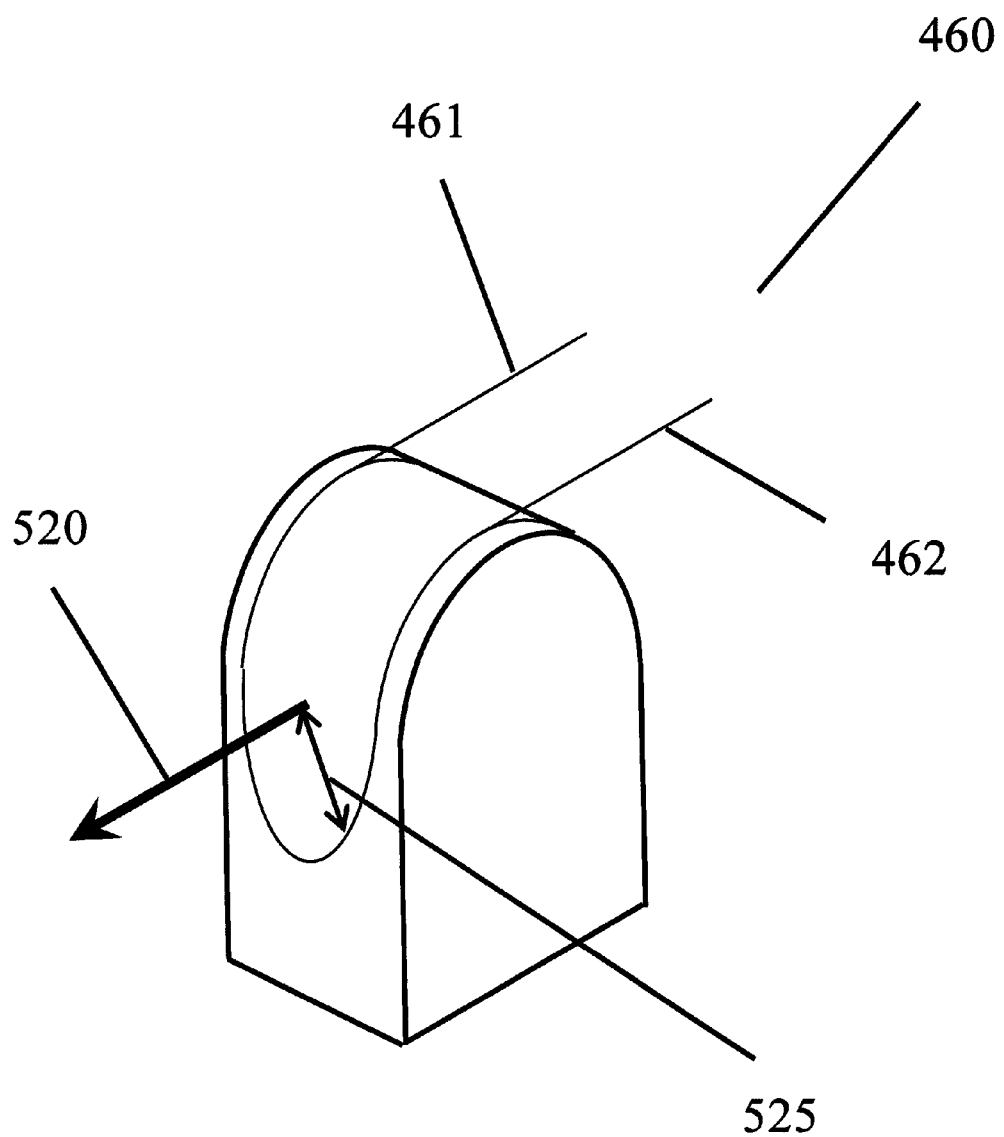
FIG. 5B shows an embodiment of a mode filtering winding path supported by the support member shown in FIG. 5A.

FIGS. 5A and 5B show an inventive mode filter. Here the multimode fiber is wound on a path that has more than one axis. In one such multi-axial fiber winding geometry multimode optical fiber is packaged on surface 502 of a support member 500. The upper part of surface 502 has a radius of curvature 515 about axis 510. A continuous length of multimode optical fiber consisting of multimode input fiber 461 and multimode output fiber 462 is attached to surface 502. When the fiber is looped around on the vertical portion of surface 502 it has a radius 525 about axis 520. Axes 510 and 520 are advantageously chosen to be perpendicular to one another. In this way a reasonably continuous loss is presented to all higher order modes. The length of multimode fiber and radii of curvature are chosen to substantially strip the power from all the higher order modes leaving only the fundamental mode of multimode output fiber 462 excited. While bend axes can be selected based on modes to be attenuated, bend curvature can be constant or can vary based on fiber core diameter and numerical aperture.

Figure 6A:
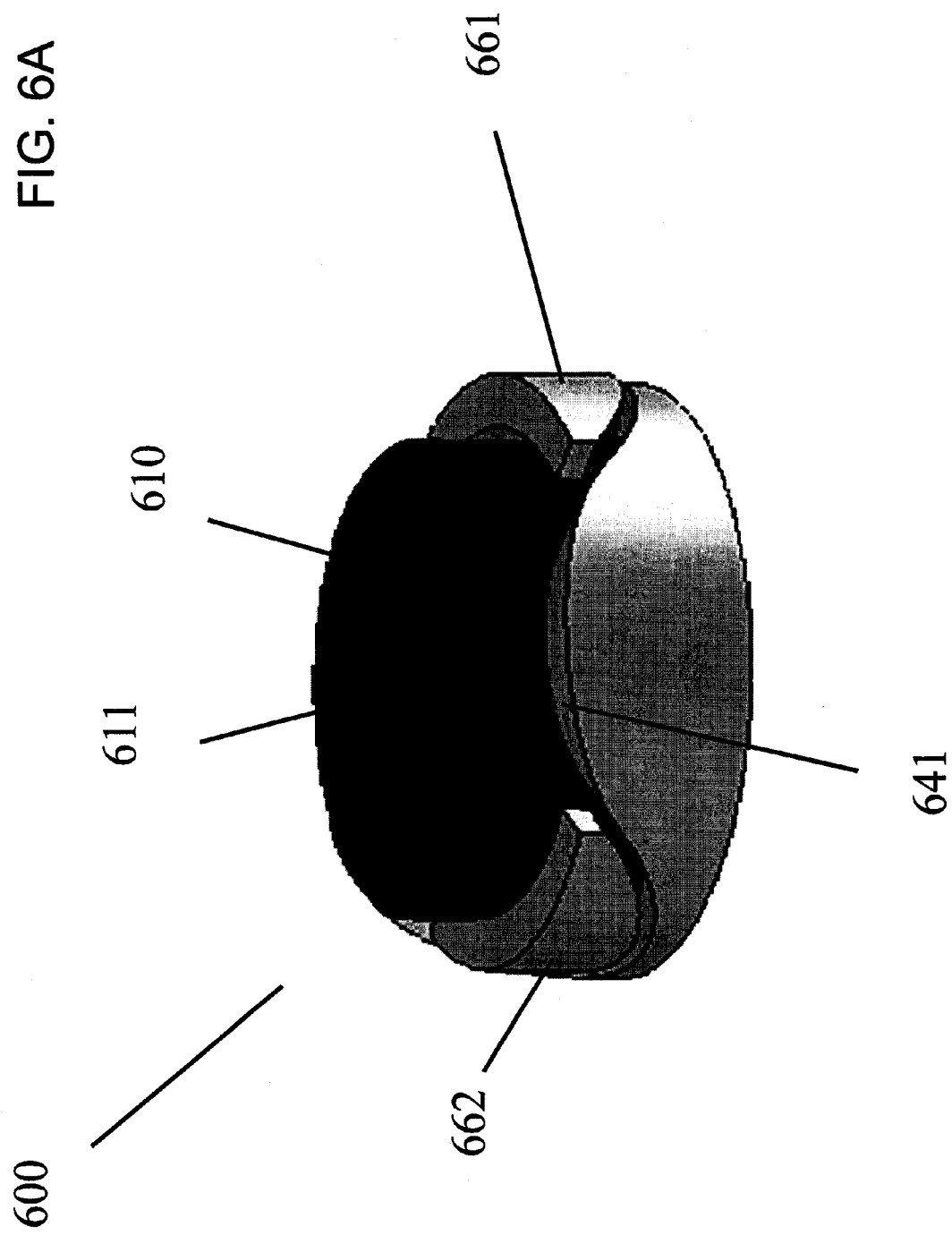
FIGS. 6A-6B shows another embodiment of a support member and mode filtering winding path in accordance with the present invention.
Figure 6B:
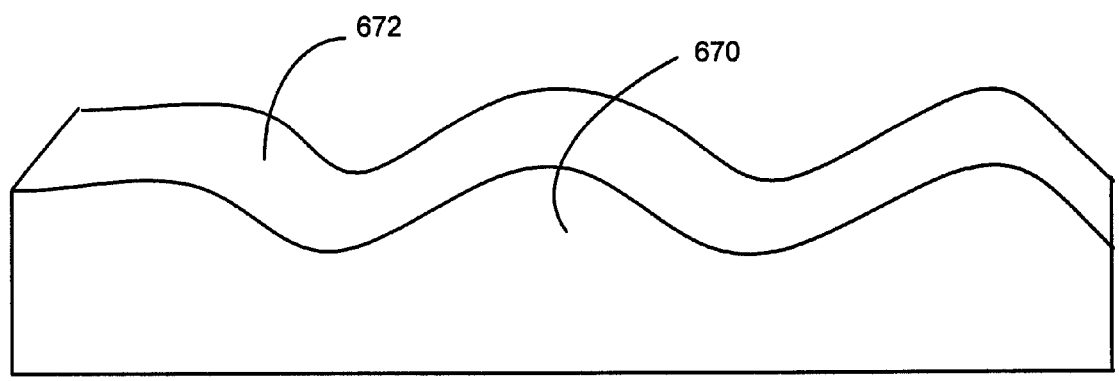
Figure 7:
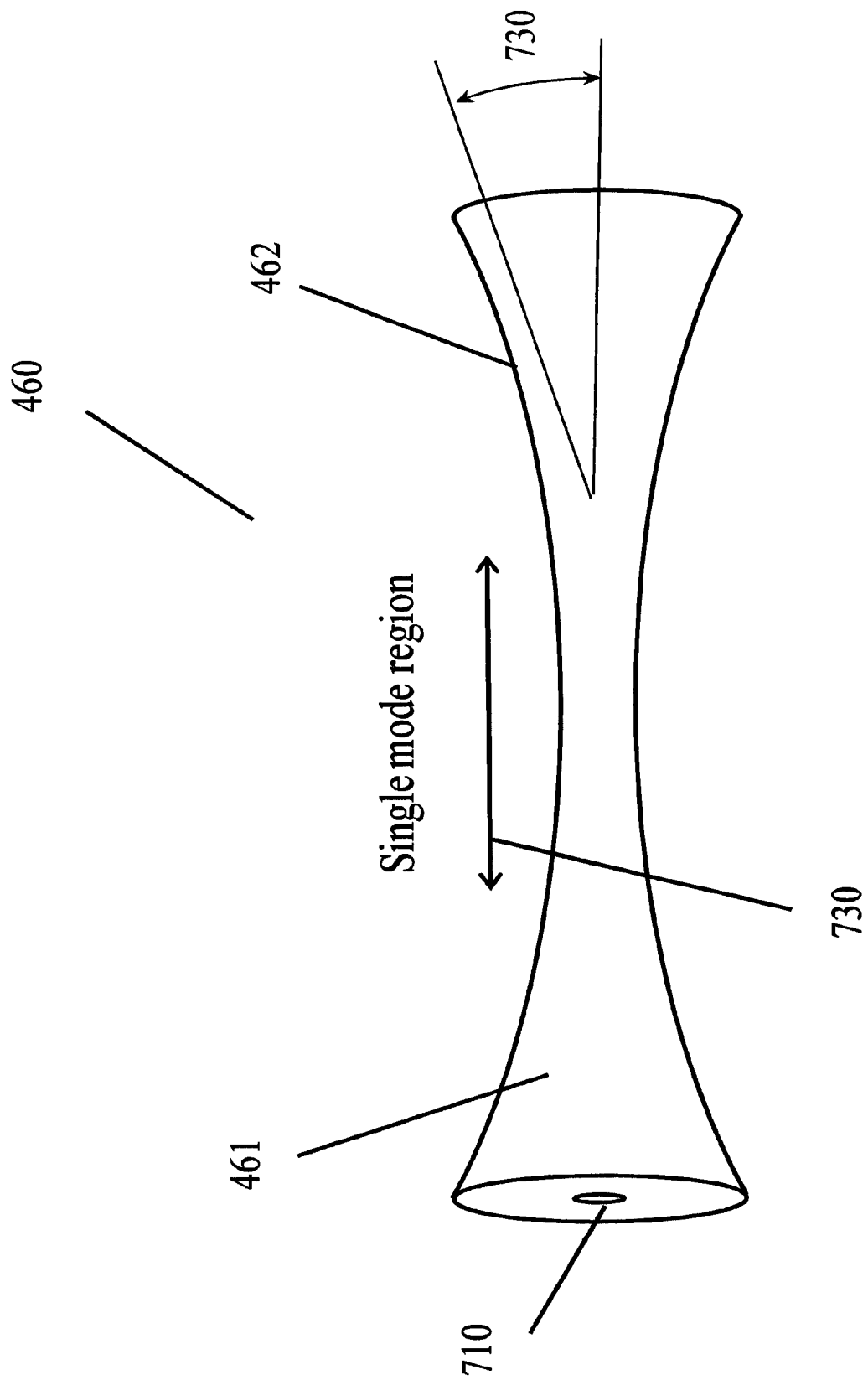
FIG. 7 shows another mode filtering arrangement in accordance with the present invention.

Mode filter 460 can also be fabricated using support member 610 as shown in FIGS. 6A-6B. Support member 610 is shown with central hole 611 that can be helpful in further packaging. Support member 610 begins as a cylinder with an axis of symmetry parallel with hole 611. Surface 641 is subsequently machined and is also the surface onto which the multimode fiber is attached. In this case, the fiber is continuously wound around the axis parallel with hole 611, but also experiences curvature along two axes that are perpendicular, or nearly perpendicular, to the axis parallel with hole 611. Additionally, mechanical members 661 and 662 can be used to help hold the fiber in place.

The mode filter of FIG. 6A can be formed by applying a tapered outer layer to a surface of a cylinder. A typical example is shown in FIG. 6B, in which a tapered layer 670 has a length selected so as to extend around a cylindrical surface. As shown in FIG. 6B, the layer includes an approximately sinusoidal or other smoothly curved surface 672. In use, the layer 670 is secured to a surface of a cylinder and fiber is wrapped about the cylinder so as to follow the curved surface 672. As noted above, a complementary piece can be made and secured to the cylinder to retain the wrapped fiber in position against the curved surface 672. Alternatively, the curve 672 can be defined as a groove in a surface of a cylinder or cone. For convenience, the surface 672 and similar surfaces that define curvatures that are orthogonal to the curvature of the cylindrical surface on which or to which the surface is secured are referred to as peripheral curved surfaces.

In yet another embodiment of mode filter 460, a taper based on multimode fiber can be made. In this embodiment a continuous length of multimode optical fiber consisting of multimode input fiber 461 and multimode output fiber 462 is tapered such that the diameter of fiber core 710 is at a minimum in the center. In other examples, the minimum fiber core diameter is at some other location in the taper. The taper is advantageously done such that over distance 730 in the center of the fiber the V-number of the core is under 2.4 such that it only supports the propagation of the fundamental mode. Distance 730 is chosen to be sufficiently long to allow all higher order mode content to be filtered out. Taper angle 730 is chosen such that the beam expansion along multimode output fiber is substantially adiabatic and no higher order modes are excited. The taper can be fabricated with any of numerous known approaches, one such approach is through the use of a variable speed draw tower. The diameter of a multimode fiber is proportional decreases with increasing draw speed. Therefore by using a draw process with a variable speed, any desired taper angle, or core size 710 as a function of length can be fabricated.

Mode filters based on fiber bending such as illustrated in FIGS. 5A-5B and FIGS. 6A-6B can also incorporate fiber tapers. If tapers are included, fiber bend radii can vary along fiber length based on local core diameter. For example, the bend radius 525 shown in FIG. 5B can vary along a fiber length. The mode filter of FIGS. 6A-6B can also be configured so that varying radii of curvature are provided with a conical or other taper. The groove 641 can be based on a varying curvature, and matched, if desired, to a local core diameter in a fiber taper. Typically, bend-induced mode filtering is not provided for fiber regions associated with single mode or few mode core diameters.

Figure 8:
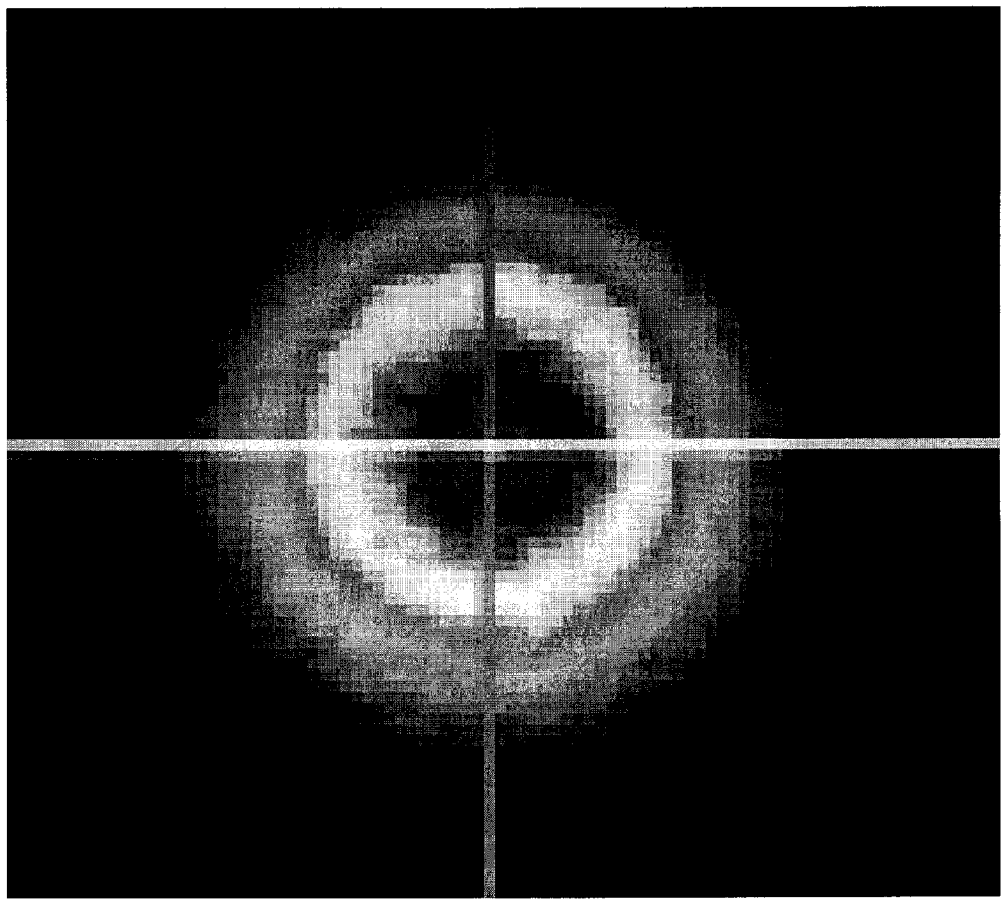
FIG. 8 shows the spatial profile of the output mode of a fiber amplifier fabricated according to the present invention.
Figure 9:
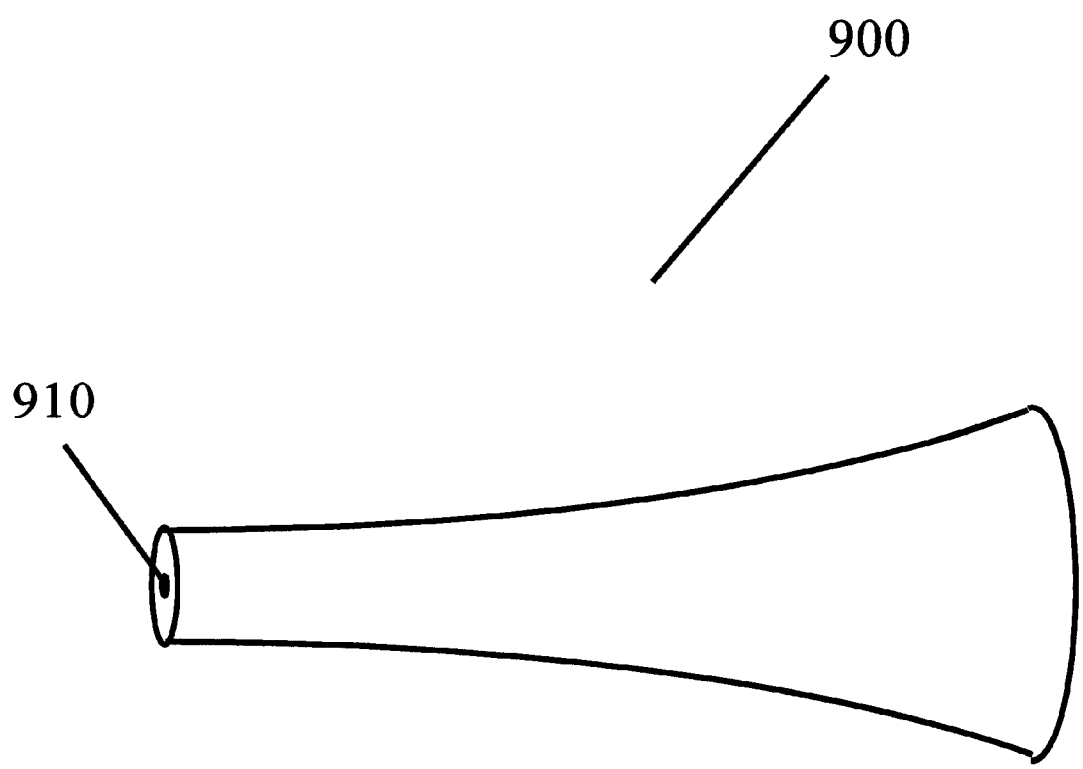
FIG. 9 shows a multimode optical fiber horn that can be used in place of the multimode optical fiber used in the amplifier in accordance with another embodiment of the present invention.
Figure 10:
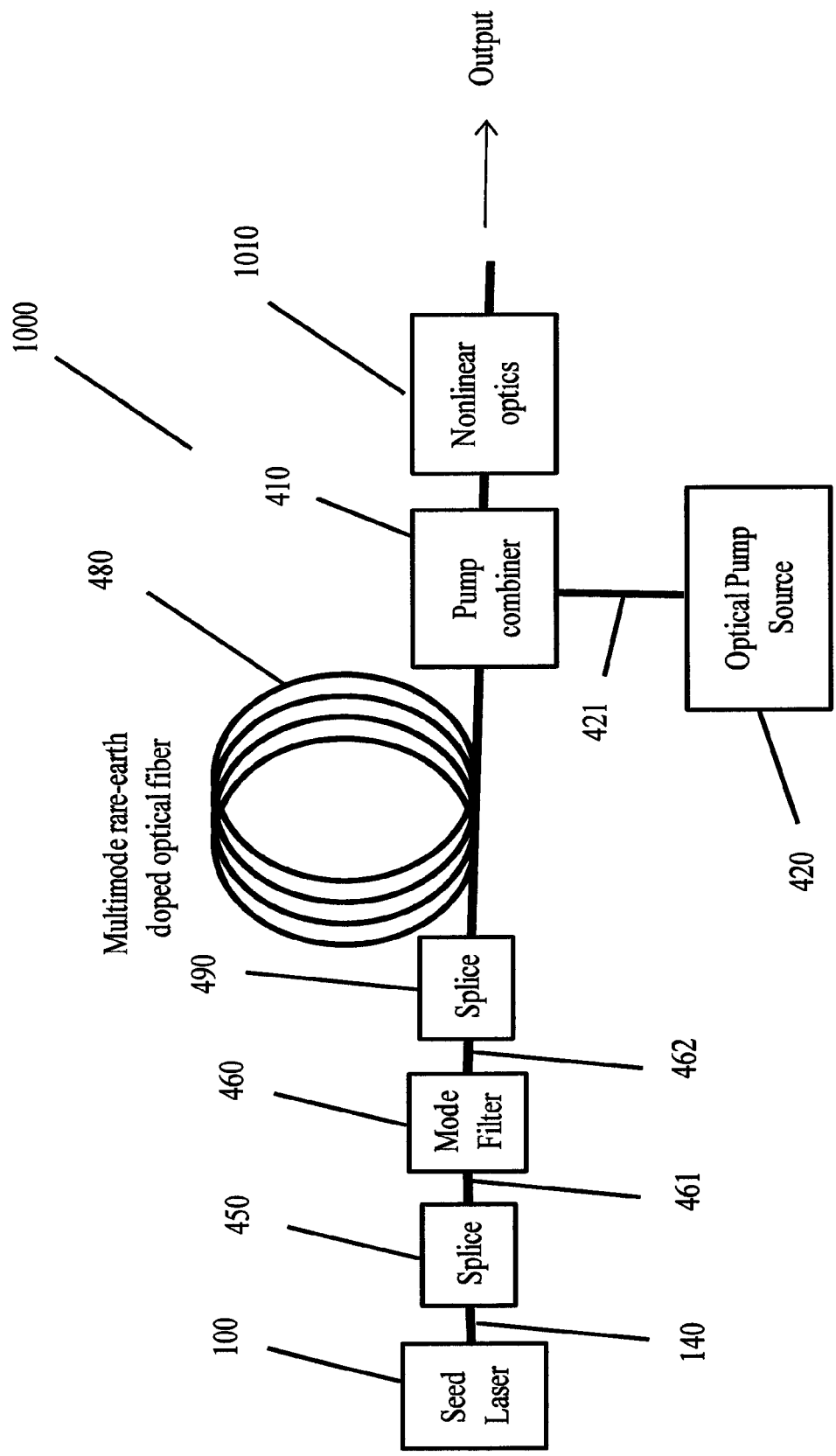
FIG. 10 shows a schematic of another embodiment of the present invention that uses nonlinear optics to frequency convert the output of the multimode fiber amplifier
Figure 11:
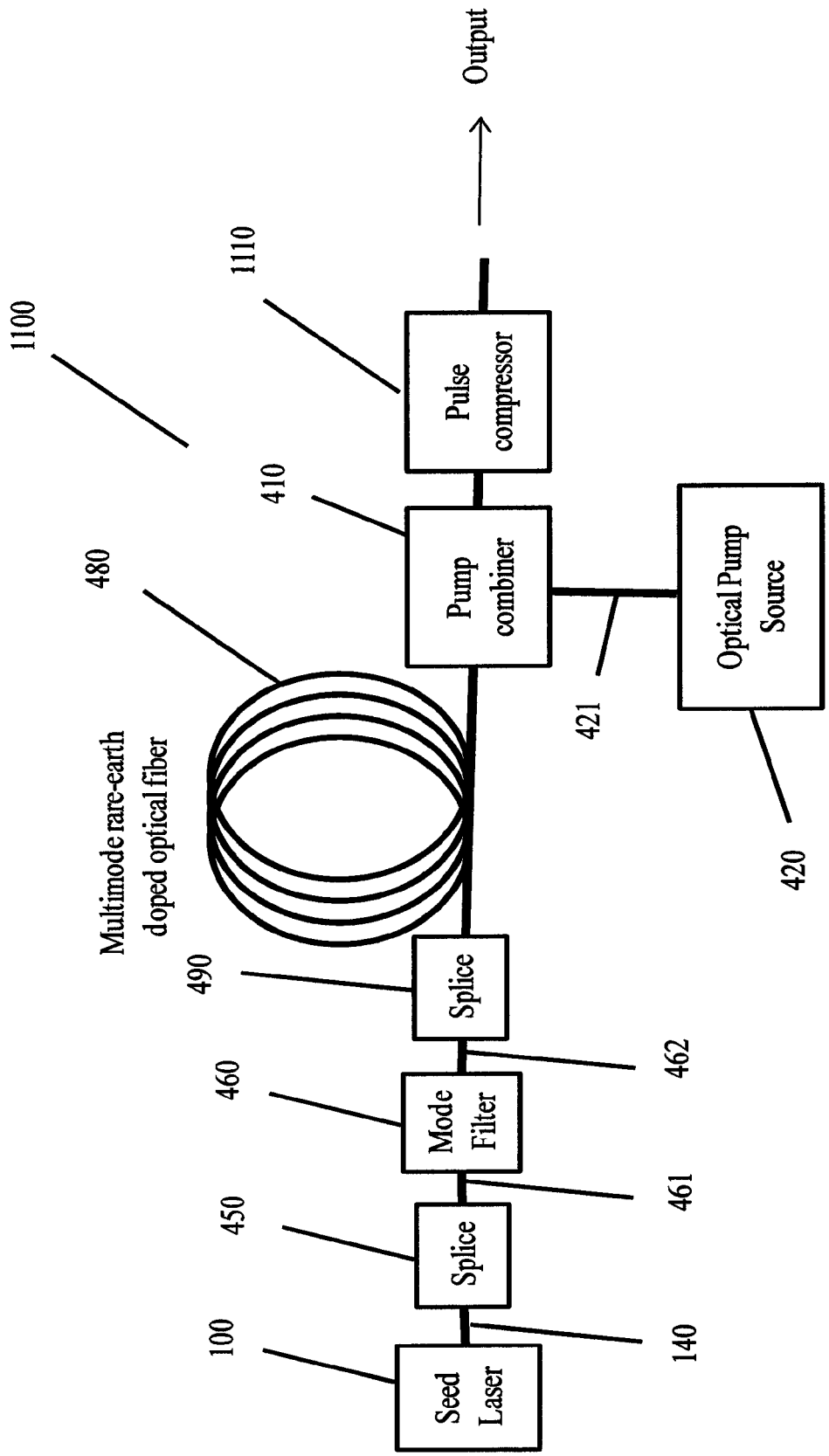
FIG. 11 shows a schematic of another embodiment of the present invention that uses a pulse compressor to shorten the temporal length of the output of the multimode fiber amplifier.

FIG. 8 shows the output of mode filter 460. Measurements of beam quality resulted in M2 values of under 1.05 confirming mode filter 460 substantially removes all the higher order mode content of a multimode fiber. Splicing output fiber 462 with splice 490 to multimode rare-earth amplifier fiber 480 amplifies the output from fiber coupled seed laser 100, but does not change the beam profile or beam quality.

Multimode rare-earth doped amplifier fiber 480 can also be fabricated as taper 900 by using a variable speed draw process. This can advantageously be used to further increase core size 910 yielding further reductions in signal irradiance. This can be beneficial in avoiding both nonlinear and damage effects in multimode rare-earth doped fiber 480 that can result from high signal irradiance levels. While the taper 900 shows a multimode fiber with a monotonically increasing diameter, this does not necessarily have to be the case. For example, an oscillating diameter as a function of length might also be useful for reducing nonlinear effects in the fiber.

System 1000 shows the addition of nonlinear optical stage 1010 that can convert the wavelength of the output from multimode rare earth doped amplifier fiber 480. For example, KTP or LBO can be used to generate second harmonic light. Further frequency conversions are also possible to generate third, fourth or even higher harmonics. Nonlinear optical stage 1010 could also be an optical parametric oscillator which would enable the output wavelength from multimode rare earth doped amplifier fiber 480 to be shifted to longer wavelengths.

Figure 12:
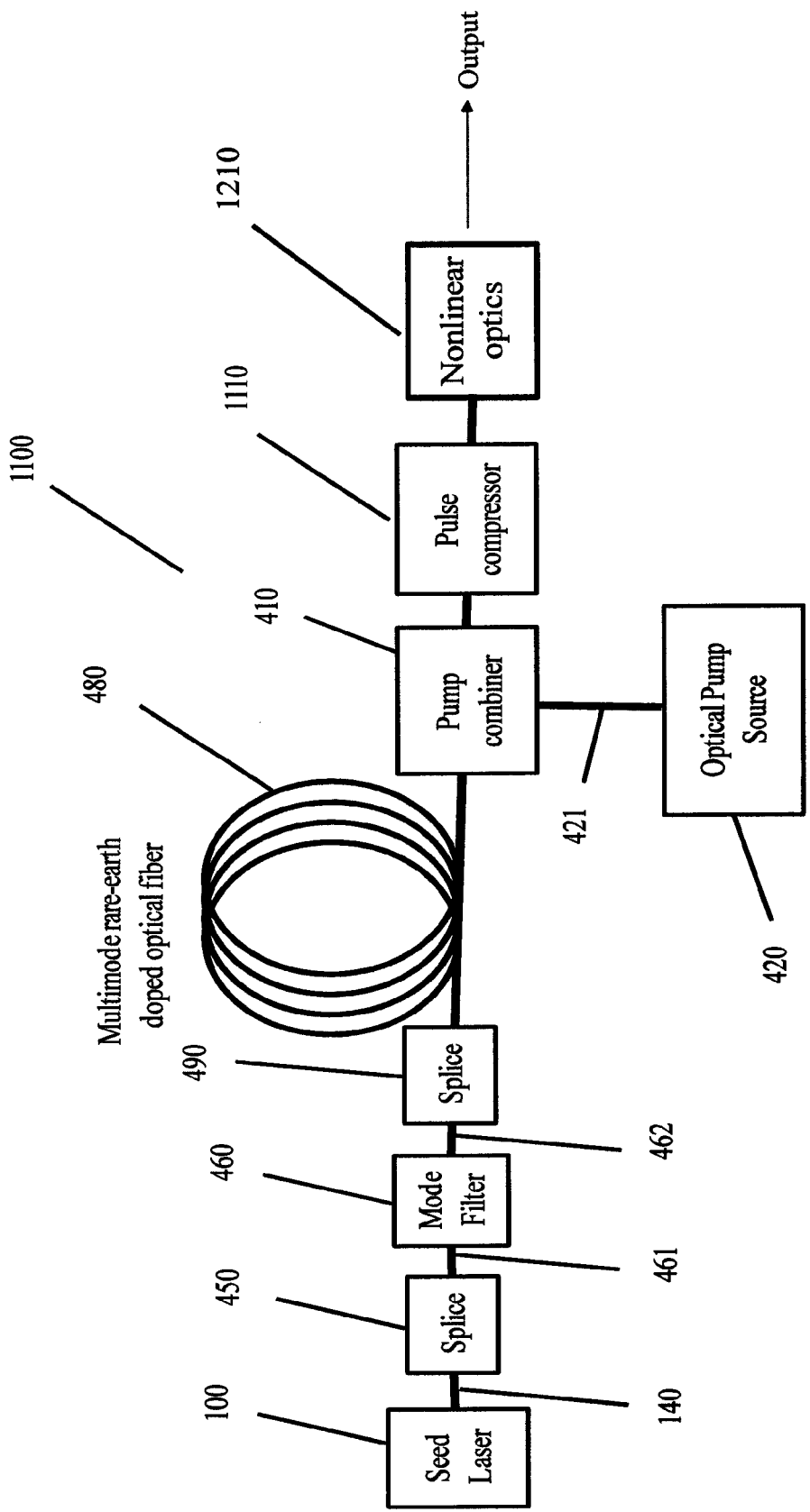
FIG. 12 shows a schematic of another embodiment of the present invention that uses a pulse compressor to shorten the temporal length of the output of the multimode fiber amplifier and nonlinear optics to frequency convert the output of the multimode fiber amplifier.

System 1100 shows the addition of a pulse compressor to shorten the pulse width of output from multimode rare earth doped amplifier fiber 480. In this case, seed laser 100 is advantageously designed or selected to produce frequency chirped pulses of significantly less than one nanosecond. Pulse compressor 1110 can then consist of a pair of bulk diffraction gratings to remove the wavelength chirp and compress the temporal output. FIG. 12 illustrates a system 1200 that includes both the pulse compressor 1110 and nonlinear optics 1210.

Power scaling may be achieved by combining the outputs from multiple amplifiers and controlling the phases and polarization state of the light emitted from the amplifiers. Phase control may be achieved by using a single seed laser and splitting the output from this seed laser into the different amplifiers. Active measurement and control of the output phase may be used to stabilize the phases over time. In such systems it is particularly important that each of the amplifiers operates in a single fundamental mode as any residual light into higher order modes will not coherently combine with the output in the fundamental modes of the amplifier array While the mode filters illustrated above can include mandrels or other supports, such supports are not necessary. For example, a fiber can be provided with a thermoplastic jacket and heated so that the jacket and fiber can be curved as desired. Once a selected curve has been achieved, the jacket is cooled so that fiber curvature is fixed. Mode filters based on either simpler or compound curvatures can be formed in this manner. Instead of including support in the mode filter, the support can be used to form multiple mode filters. For example, a jacketed fiber with a softened jacket can be wound about a cylinder. Upon cooling the jacket, the fiber can retain the curvature associated with the winding. In other examples, a fiber and jacket are suitably shaped, and an epoxy is injected into a space between the jacket and the fiber. In other examples, the fiber can be coating with a thermoplastic or an epoxy, and frozen into a desired simple or compound curvature.

Figure 13:
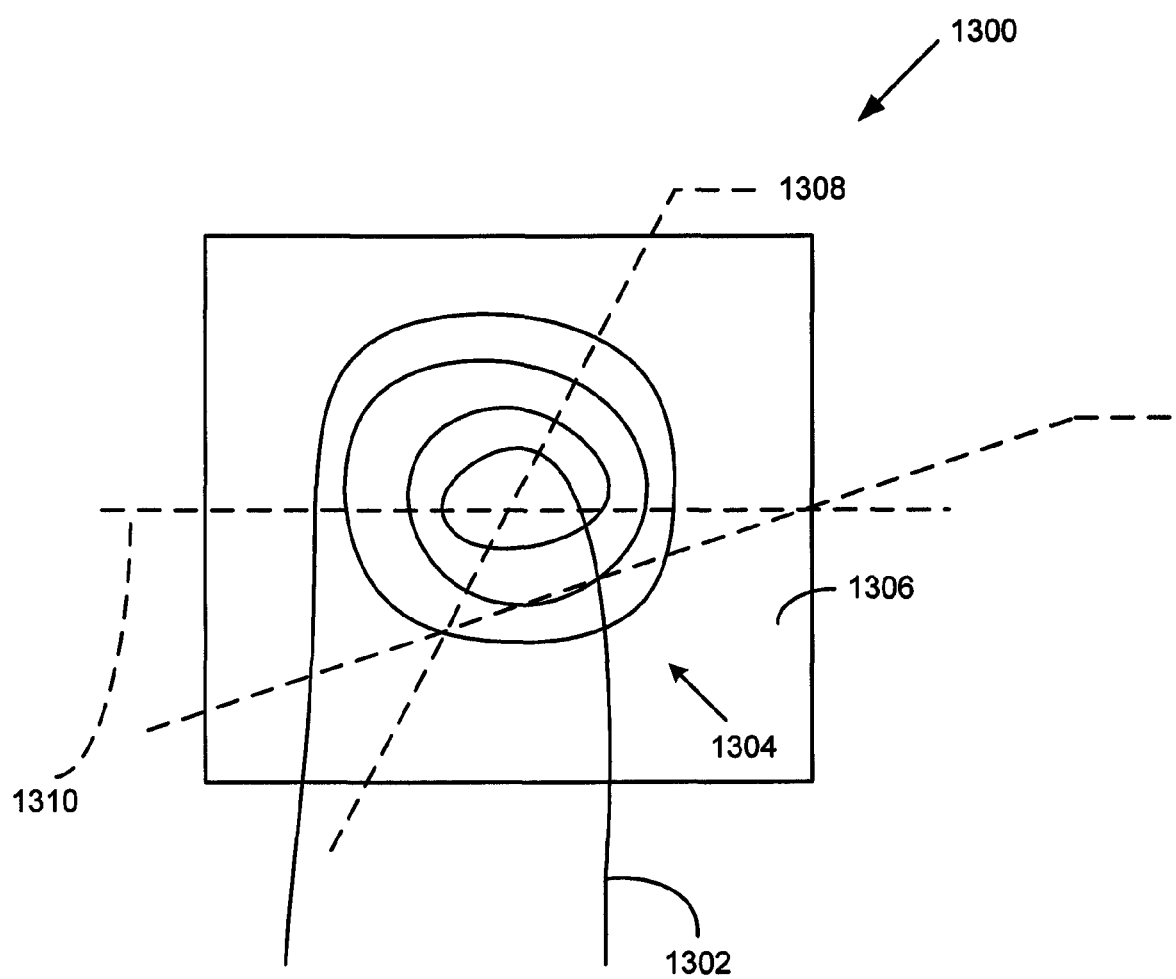
FIG. 13 illustrates another representative mode filter.

Referring to FIG. 13, a mode filter 1300 includes a fiber 1302 that is shaped so as to define a fiber spiral 1304 on a flexible substrate 1306. Typically, the flexible substrate 1306 is planar (such as a sheet of paper), but curved substrates can be used as well. The spiral 1304 is generally either temporarily or permanently secured to the flexible substrate 1306. In order to provide a compound curvature, the mode filter 1300 can be folded, partially folded, or bent along an axis (such as axes 1308, 1310, 1312). In some examples, the flexible substrate 1306 is partially wrapped about a cylinder, or applied so another planar or non-planar surface. In other examples, the fiber 1302 is shaped so as to define one or more loops, arcs, ellipses or other curves or parts of curves, serpentines on the flexible substrate 1306.

While some particular examples and applications are described above, the disclosed technology is not limited to such examples. In some examples, an optical isolator is situated between a seed source and a gain region, or at some other location in an amplifier system. It is convenient to provide fiber pigtails for coupling into and out of an isolator, and such fiber pigtails can be configured to provide mode filtering and attenuation as described above. Generally, additional filtering is provided on an isolator output, and such filtering tends to improve isolation performance. Other fiber or waveguide-based components can include, for example, fiber Bragg gratings.

In other examples, after suitable mode filtering is provided in a waveguide system, additional filtering can be provided to attenuate higher order modes that are excited by subsequent scattering or miscouplings. Such modal filtering can be provided periodically, occasionally, or continuously in one or more fibers so as to attenuate these higher order modes. For example, an active fiber can be bent around one or more mandrels with bends around one or more axes.

In view of the many possible embodiments to which the principles of the disclosed technology may be applied, it should be recognized that the illustrated embodiments are only preferred examples of the invention and should not be taken as limiting.

We claim:

1. A mode filter, comprising:
   an input multimode fiber section operable to receive an optical input beam;
   a passive mode filtering section operable to attenuate fiber modes in the input optical beam as received from the input multimode fiber section, wherein the passive mode filtering section provides at least about 3 dB of attenuation of an $LP_{11}$ mode propagating in the mode filtering fiber section; and
   an output multimode fiber section situated to receive the mode filtered optical beam and situated so that the mode filtered optical beam substantially excites only a lowest order mode in the output multimode fiber section, wherein the passive mode filtering section comprises a multimode fiber section that includes a tapered portion having an input core cross-sectional area, a minimum taper core cross-sectional area, and an output core cross-sectional area, wherein the input and output core cross-sectional areas define multimode cores and the minimum taper core cross-sectional area defines a few mode core.

2. A mode filter, comprising:
   an input multimode fiber section operable to receive an optical input beam;
   a passive mode filtering section operable to attenuate fiber modes in the input optical beam as received from the input multimode fiber section, wherein the passive mode filtering section provides at least about 3 dB of attenuation of an $LP_{11}$ mode propagating in the mode filtering fiber section; and
   an output multimode fiber section situated to receive the mode filtered optical beam and situated so that the mode filtered optical beam substantially excites only a lowest order mode in the output multimode fiber section, wherein the passive mode filtering section comprises a multimode fiber section that includes a tapered portion having an input core cross-sectional area, a minimum taper core cross-sectional area, and an output core cross-sectional area, wherein the input and output core cross-sectional areas define multimode cores and the minimum taper core cross-sectional area defines a single mode core.

3. The mode filter of claim 2, wherein the input, output, and minimum taper core cross-sectional areas are substantially circular.

4. A mode filter, comprising:
   an input multimode fiber section operable to receive an optical input beam;
   a passive mode filtering section operable to attenuate fiber modes in the input optical beam as received from the input multimode fiber section, wherein the passive mode filtering section provides at least about 3 dB of attenuation of an $LP_{11}$ mode propagating in the mode filtering fiber section; and
   an output multimode fiber section situated to receive the mode filtered optical beam and situated so that the mode filtered optical beam substantially excites only a lowest order mode in the output multimode fiber section, wherein the mode filtering section comprises a multimode fiber section having at least a first bend and a second bend associated with first and second axis of curvature, respectively, wherein the first and second axes of curvature are not collinear.

5. The mode filter of claim 4, wherein the first and second axes of curvature are encountered before the fiber makes a complete loop.

6. The mode filter of claim 4, wherein the first and second radii of curvature are substantially the same.

7. The mode filter of claim 4, wherein the first and second axes of curvature are substantially orthogonal.

8. The mode filter of claim 4, further comprising a mandrel having a fiber mounting surface that is curved about a first axis of curvature and the fiber section is curved about a second axis of curvature and secured to the fiber mounting surface such that the first and second axes of curvature are substantially orthogonal.

9. The mode filter of claim 4, further comprising a cylindrical mandrel having a peripheral curved surface, wherein the fiber section is secured so as to have curvatures that are associated with the cylindrical curvature and an orthogonal peripheral curvature.

10. The mode filter of claim 9, wherein the peripheral curved surface is defined as a groove in a cylindrical surface.

11. The mode filter of claim 2, wherein the passive mode filtering section includes a polarization maintaining fiber section.

12. An optical amplifier system, comprising:
    a light source for producing a seed light beam; a mode filter operable to receive the seed light beam, the mode filter comprising a passive multimode optical fiber that includes a mode filtering fiber portion configured to provide an attenuation of at least 3 dB to an $LP_{11}$ mode, the mode filtering fiber portion includes a passive mode filtering section, wherein the passive mode filtering section comprises a multimode fiber section that includes a tapered portion having an input core cross-sectional area, a minimum taper core cross-sectional area, and an output core cross-sectional area, wherein the input and output core cross-sectional areas define multimode cores and the minimum taper core cross-sectional area defines a few mode core, and
    a multimode fiber amplifier, comprising a rare earth doped multimode amplifier optical fiber configured to receive the mode filtered seed light beam, and a pump light source configured to direct pump light into the rare earth doped multimode amplifier optical fiber and produce optical gain.

13. The optical amplifier system of claim 12, wherein the passive mode filtering section includes a polarization maintaining fiber section.

14. The optical amplifier system of claim 12, wherein core diameters and numerical apertures of the mode filter multimode optical fiber and the multimode amplifier optical fiber have V-numbers that differ by less than approximately 20 percent.

15. An optical amplifier system, comprising:
    a light source for producing a seed light beam;

a mode filter operable to receive the seed light beam, the mode filter comprising a passive multimode optical fiber that includes a fiber portion configured to provide an attenuation of at least 3 dB to an $LP_{11}$ mode, and a multimode fiber amplifier, comprising a rare earth doped multimode amplifier optical fiber configured to receive the mode filtered seed light beam, and a pump light source configured to direct pump light into the rare earth doped multimode amplifier optical fiber and produce optical gain, wherein the mode filter multimode fiber is wound along a path with a non-constant axis of curvature and a radius of curvature such that the non-constant axis of curvature and the radius of curvature create a substantially higher loss for the at least one higher order mode than for the fundamental mode.

16. The optical amplifier system of claim 15, wherein the mode filter multimode fiber comprises:

a down-tapered section tapered to a V-number of less than about 2.5 such that the at least one higher order mode is substantially attenuated; and an up-tapered section, wherein an output core from the up-tapered section is substantially matched to an input core size of the amplifier optical fiber.

17. The optical amplifier system of claim 12, wherein the mode filter multimode fiber comprises: a down-tapered section tapered to a V-number of less than about 2.5 such that the at least one higher order mode is substantially attenuated; and an up-tapered section, wherein an output core from the up-tapered section is substantially matched to an input core size of the amplifier optical fiber.

18. The optical amplifier system of claim 12, wherein the rare earth doped multimode amplifier optical fiber has a core with a V-number greater than 4.

19. The optical amplifier system of claim 12, wherein the rare earth doped multimode amplifier optical fiber has a core diameter between 10 and 150 microns.

20. The amplifier system of claim 12, wherein the rare earth doped multimode amplifier fiber includes at least a portion having a varying core size.

21. An optical amplifier system, comprising:

a light source for producing a seed light beam;

a mode filter operable to receive the seed light beam, the mode filter comprising a passive multimode optical fiber that includes a fiber portion configured to provide an attenuation of at least 3 dB to an $LP_{11}$ mode, and a multimode fiber amplifier, comprising a rare earth doped multimode amplifier optical fiber configured to receive the mode filtered seed light beam, and a pump light source configured to direct pump light into the rare earth doped multimode amplifier optical fiber and produce optical gain, wherein the mode filter multimode fiber includes a bent fiber portion configured to provide substantial attenuation for higher order modes.

22. The optical amplifier system of claim 12, further comprising an optical amplifier situated so as to receive the pump beam.

23. The optical amplifier system of claim 12, wherein the mode filter multimode fiber has only a single optical cladding disposed around the fiber core.

24. The optical amplifier system of claim 12, further comprising at least one nonlinear element situated to receive an amplified optical beam from the multimode fiber amplifier.

25. The optical amplifier system of claim 23, wherein the at least one nonlinear optical element is configured to produce a harmonic of the amplified optical beam received from the multimode fiber amplifier.

26. The optical amplifier system of claim 25, wherein the harmonic is second, third, fourth, or fifth harmonic.

27. The optical amplifier system of claim 24, wherein the at least one nonlinear optical element is configured as an optical parametric oscillator to frequency downshift the amplified optical beam received from the multimode fiber amplifier.

28. The optical amplifier system of claim 12, wherein the light source is configured to provide temporally stretched pulses from a pulsed laser with output pulses having durations of less than approximately 50 picoseconds, and further comprising a pulse compressor situated to receive an amplified optical beam from the multimode fiber amplifier and provide a compressed optical beam.

29. The optical amplifier system of claim 28, further comprising at least one nonlinear optical element situated to receive the compressed optical beam from the pulse compressor.

30. The optical amplifier system of claim 29, wherein the at least one nonlinear optical element is configured to produce a harmonic of the compressed optical beam.

31. The optical amplifier system of claim 30, wherein the harmonic is second, third, fourth, or fifth harmonic.

32. An optical amplifier system, comprising a plurality of optical amplifier systems as recited in claim 12, wherein each of the plurality produces a respective output optical beam, and each of the beams is configured so as to have a common phase and state of polarization.

33. The optical amplifier system of claim 12, wherein the passive mode filtering section includes a polarization maintaining fiber section and the rare earth doped multimode amplifier optical fiber is a polarization maintaining optical fiber.

34. An optical amplifier system, comprising:

a light source for producing a seed light beam;

a mode filter operable to receive the seed light beam, the mode filter comprising:

an input multimode fiber section operable to receive an optical input beam;

a passive mode filtering section operable to attenuate fiber modes in the input optical beam as received from the input multimode fiber section, wherein the passive mode filtering section provides at least about 3 dB of attenuation of an $LP_{11}$ mode propagating in the mode filtering fiber section; and an output multimode fiber section situated to receive the mode filtered optical beam and situated so that the mode filtered optical beam substantially excites only a lowest order mode in the output multimode fiber section, wherein the passive mode filtering section comprises a multimode fiber section that includes a tapered portion having an input core cross-sectional area, a minimum taper core cross-sectional area, and an output core cross-sectional area, wherein the input and output core cross-sectional areas define multimode cores and the minimum taper core cross-sectional area defines a single mode core: and a multimode fiber amplifier, comprising a rare earth doped multimode amplifier optical fiber configured to receive the mode filtered seed light beam, and a pump light source configured to direct pump light into the rare earth doped multimode amplifier optical fiber and produce optical gain.

* * * * *